Jan. 10, 1956
E. A. HARTY
2,730,663
UNILATERALLY CONDUCTIVE DEVICE
Filed March 20, 1953
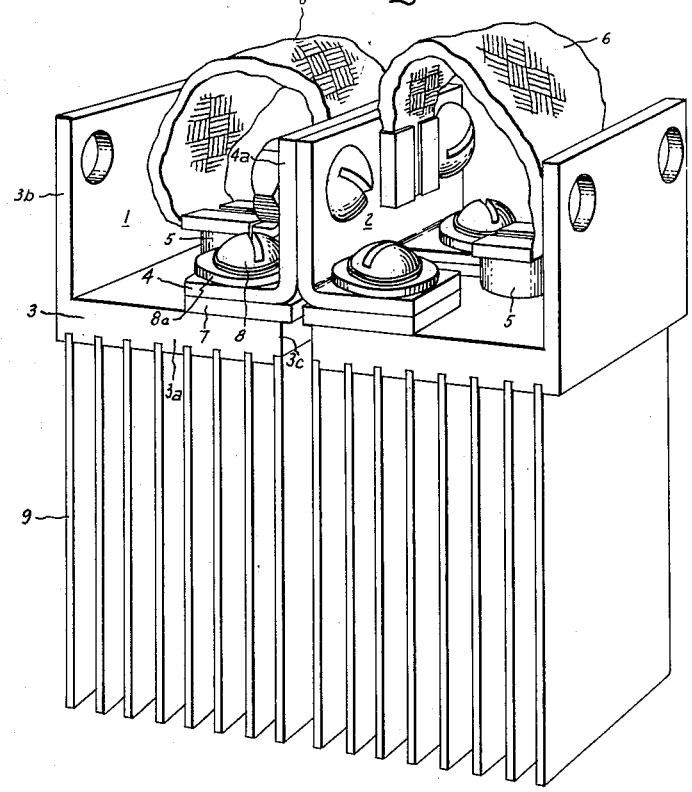
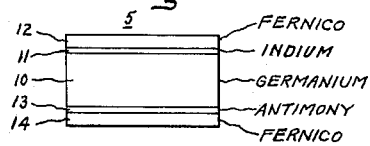
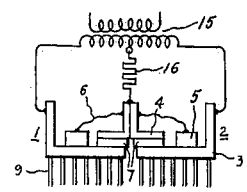
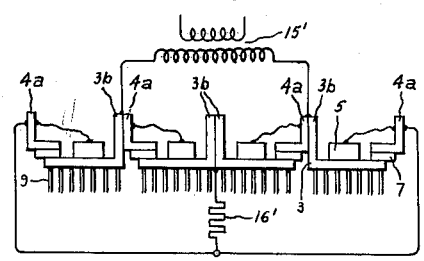
Inventor:
Edgar A. Harty,
by Claude H. Mott
His Attorney.

United States Patent Office 2,730,663
Patented Jan. 10, 1956

2,730,663

UNILATERALLY CONDUCTIVE DEVICE

Edgar A. Harty, Marblehead, Mass., assignor to General Electric Company, a corporation of New York Application March 20, 1953, Serial No. 343,588

6 Claims. (Cl. 317—234)

My invention relates to unilaterally conductive devices, and more particularly to means for mounting individual unilaterally conductive cells of the high current density type for ready connection in multiple assembled relation and for cooling. The invention is particularly applicable to broad area unilaterally conductive cells of the germanium type.

In the copending application of Robert N. Hall, Serial No. 187,478, filed September 29, 1950, and assigned to the same assignee as the present application, there is described and claimed an improved semi-conductor rectifier of the broad area type and an improved method of controllably producing the rectification barrier or P–N junction. Such cells are capable of carrying large currents through small rectification areas, and as a consequence the heat developed is very appreciable. For power rectifier applications it is desirable to assemble each single cell in a separate strong and durable mounting thereby to form separate unilaterally conductor devices which are readily handled individually and are capable of being assembled into gangs or stacks. Moreover, with such devices forced cooling is ordinarily necessary, because the large amount of heat generated by the high current-carrying capacity of the individual cells would render the individual devices, including the cell mountings, of awkward size if they were made sufficiently large to provide adequate natural cooling merely from the terminal surfaces alone.

Accordingly, therefore, it is a principal object of my invention to provide a mounting for individual unilaterally conductive cells or elements which is compact, inexpensive and rugged, and which is easily handled and readily assembled with like devices into gangs or stacks to provide multiple or series connection of a plurality of cells.

In carrying out my invention in one form, I provide a terminal block formed of two L-shaped bars of electric conducting material such as copper or the like. One bar is provided with a long arm constituting a base, and a short upturned arm constituting a first terminal. The other L-shaped bar is mounted with one of its arms in overlying relation with the remote end of the base opposite the upturned first terminal and with its upturned arm disposed in parallel spaced-apart relation with the first terminal to constitute a second terminal. The two L-shaped bars are electrically insulated from each other and together constitute a substantially U-shaped terminal block, the opposite end walls of which constitute terminals of the device. The outer surface of the second terminal wall is offset outwardly to some extent from the juxtaposed end of the base, so that the U-shaped assembly may be bolted together, end-to-end, with similar assemblies without short-circuiting between the terminals. Upon the base between the terminal walls there is mounted a unilaterally conductive device having spaced-apart parallel contact surfaces, the device being mounted with one contact surface conductively secured to the base. The upper contact surface of the cell is connetced by an electric conductor, such as a flexible strap, to the L-shaped bar constituting the second terminal.

My invention itself will be more fully understood and its various objects and advantages further appreciated by referring now to the following detailed specification taken in conjunction with the accompanying drawing in which Fig. 1 is a perspective view of two unilaterally conducting devices involving my invention assembled together in end-to-end relation; Fig. 2 is an enlarged cross-sectional view of a unilaterally conductive cell such as those shown in Fig. 1; Fig. 3 is a schematic diagram of connections showing the assembly of Fig. 1 connected as a full-wave center-tap rectifier; and Fig. 4 is a similar schematic diagram showing an assembly of four such devices connected in bridge-circuit relation as a rectifier bridge.

Referring now to the drawing, and particularly to Fig. 1, I have shown a pair of unilaterally conductive devices 1 and 2 of similar construction connected together in back-to-back relation, each device comprising a pair of L-shaped copper bars or straps 3 and 4 insulatingly connected together in overlapping opposing relation to form a U-shaped terminal structure within which is mounted a unilaterally conductive cell 5 having one contact surface conductively secured to the bar 3 and the other contact surface conductively connected through a flexible conductor 6 to the other bar 4.

More specifically, the L-shaped copper bar 3 is provided with a long arm 3a constituting a base portion and an upright side arm or wall 3b constituting together with the base portion a first terminal. The other L-shaped copper bar 4 is provided with two relatively short arms, one of which is insulatingly secured in overlapping relation to the end of the base arm 3a, as by an interleaved layer of insulation 7, connecting bolts 8, and an insulating sleeve (not shown) and insulating washer 8a for each bolt 8. The upright side arm or wall 4a of the L-shaped bar 4 is disposed in substantially parallel spaced relation with the side wall 3b and constitutes a second terminal. The outer surface of the side wall 4a is offset outwardly from the juxtaposed edge 3c of the base 3a so that when a plurality of devices are connected in cascade relation as shown in Fig. 1 the base portions are spaced apart to prevent short-circuiting of the devices. From the lower surface of the base portion 3a there extends a plurality of cooling fins 9 in parallel spaced relation.

Mounted upon the base portion 3 of each device 1 and 2 between the side walls 3b and 4a is a unilaterally conductive cell 5 having a semi-conductor region lying intermediate a pair of parallel, spaced-apart contact surfaces. One of the contact surfaces is conductively secured to the upper surface of the base portion 3a and the other contact surface is connected, as through a flexible copper strap 6, to the other terminal member 4.

Preferably, the unilaterally conductive cell 5 is of the broad area, germanium type, one form of which is illustrated in greater detail at Fig. 2. As there shown, the cell comprises a germanium crystal 10 provided upon one face with a layer or film of indium 11 and an overlying layer 12 of fernico, and on the opposite face with a film or layer 13 of antimony and an overlying layer 14 of fernico. As more fully described and claimed in the above-mentioned copending application of Hall, a P–N junction is created in such a device by placing upon the germanium crystal a deposit of an acceptor impurity, such as the indium, and on the other surface a deposit of a donor impurity, such as the antimony. These impurities are melted onto the crystal, whereby they diffuse into the germanium piece and produce P-type and N-type induction characterized portions, respectively, in the germanium with a P–N junction therebetween. While it is possible thereafter to remove the impurity deposits and make connections directly, as by soldering, to these surface portions, it is expedient to leave the deposits secured as integral parts of the semi-conductive piece and to make connections to the surface portions thereof through the impurity deposits, as by soldering to the surfaces the contact surface pieces 12 and 14 of fernico.

At Fig. 3 I have shown the unilaterally conductive devices 1 and 2 of Fig. 1 connected in a center-tap, back-to-back arrangement in a full-wave rectifier circuit which is supplied with alternating current through a transformer 15 and supplies unidirectional current to an electric load device 16.

At Fig. 4 I have shown a differently connected group of similar unilaterally conducting devices connected in bridge-circuit relation through an alternating current supply transformer 15' and supplying direct current to an electric load device 16'.

While I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A unilaterally conductive device comprising an electrically conductive terminal block having a base and a pair of opposite side walls disposed in spaced apart relation, one said side wall being electrically connected to said base to constitute therewith a first terminal and the other said side wall being electrically insulated from said base to constitute a second terminal, a unilaterally conductive cell mounted on said base between said side walls and having spaced apart contact surfaces one of which is conductively secured to said base, and an electric conductor connected between the other said contact surface of said cell and said second terminal.

2. A unilaterally conductive device comprising an electrically conductive terminal block having a base and a pair of opposite upright side walls disposed in spaced apart relation, one said side wall being electrically connected to said base to constitute therewith a first terminal and the other said side wall being insulated from said base to constitute a second terminal, said other side wall having an outer surface offset outwardly from the juxtaposed edge of said base whereby said side walls may be connected in flatwise engaging relation with similar side walls of adjacent unilaterally conductive devices without short-circuiting between said first and second terminals, a unilaterally conductive cell mounted on said base between said side walls and having spaced apart contact surfaces one of which is conductively secured to said base, and an electric conductor connected between the other said contact surface of said cell and said second terminal.

3. A unilaterally conductive device comprising an electrically conductive terminal block having a base provided with flat upper and lower surfaces and including a pair of oppositely disposed upright side walls extending from said base beyond said upper surface in parallel spaced relation, one said side wall being electrically connected to said base to constitute therewith a first terminal and the other said side wall being electrically insulated from said base to constitute a second terminal, a broad area semi-conductor cell having a P–N junction between two spaced apart contact surfaces thereof fixed to said upper surface between said side walls, one said contact surface being conductively secured in flatwise engaging relation with said upper surface of said base, an electric conductor connected between the other said contact surface and said second terminal, and heat-dissipating means disposed in heat conductive relation with said lower surface of said base.

4. A unilaterally conductive device comprising an electrically conductive terminal block having a base provided with flat upper and lower surfaces and including a pair of oppositely disposed upright side walls extending from said base beyond said upper surface in parallel spaced relation, one said side wall being electrically connected to said base to constitute therewith a first terminal and the other said side wall being insulated from said base to constitute a second terminal, said other side wall having an outer surface offset outwardly from the juxtaposed edge of said base whereby said side walls may be connected in flatwise engaging relation with similar side walls of adjacent unilaterally conductive devices without short-circuiting between said first and second terminals, a broad area semi-condutor cell having a P–N junction between two spaced apart contact surfaces thereof fixed to said upper surface between said side walls, one said contact surface being conductively secured in flatwise engaging relation with said upper surface of said base, an electric conductor connected between the other said contact surface on said second terminal, and a plurality of cooling fins fixed to said lower surface of said base and extending therefrom.

5. A unilaterally conducting device comprising an L-shaped bar of electric conducting material having a long arm constituting a base and an upright short arm constituting a first terminal, a second L-shaped bar of electric conducting material having one arm overlying the end of said base and secured thereto in electrically insulated relation and having an upright arm constituting a second terminal disposed in spaced relation with said first terminal, said second L-shaped bar being offset outwardly beyond said end of said base, a unilaterally conductive cell mounted on said base between said terminals and having spaced apart contact surfaces one of which is conductively secured to said base, and an electric conductor connected between the other said contact surface of said cell and said second terminal.

6. A unilaterally conducting device comprising an L-shaped bar of electric conducting material having a long arm constituting a base and an upright short arm constituting a first terminal, a second L-shaped bar of electric conducting material having one arm overlying the end of said base and secured thereto in electrically insulated relation and having an upright arm constituting a second terminal disposed in parallel spaced relation with said first terminal, said second L-shaped bar being offset outwardly beyond said end of said base, a broad area semi-conductor cell having a P–N junction between two spaced apart contact surfaces thereof fixed to said base between said terminals, one said contact surface being conductively secured in flatwise engaging relation with said base, an electric conductor connected between the other said contact surface of said cell and said second terminal, and heat-dissipating means connected in heat conducting relation with said base.

References Cited in the file of this patent

UNITED STATES PATENTS 1,723,584    Shoemaker _____ Aug. 6, 1929